(12) United States Patent
Garces et al.

(10) Patent No.: US 11,006,646 B2
(45) Date of Patent: May 18, 2021

(54) SYSTEM AND METHOD FOR REGULATING THE FLOW OF SMOKE IN AN INDOOR SMOKER

(71) Applicant: Haier US Appliance Solutions, Inc., Wilmington, DE (US)

(72) Inventors: Tomas Garces, Louisville, KY (US); Samuel Vincent DuPlessis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 190 days.

(21) Appl. No.: 15/969,889

(22) Filed: May 3, 2018

(65) Prior Publication Data

US 2019/0335773 A1    Nov. 7, 2019

(51) Int. Cl.
*A23B 4/052*    (2006.01)
*A23L 5/10*    (2016.01)
*B01D 53/86*    (2006.01)
*A47J 37/07*    (2006.01)

(52) U.S. Cl.
CPC ............ *A23B 4/0523* (2013.01); *A23B 4/052* (2013.01); *A23L 5/17* (2016.08); *A47J 37/0754* (2013.01); *B01D 53/8643* (2013.01); *A23V 2002/00* (2013.01); *B01D 2255/1021* (2013.01); *B01D 2255/1023* (2013.01); *B01D 2255/1025* (2013.01)

(58) Field of Classification Search
CPC ..... A47J 37/0754; A23B 4/052; A23B 4/0523

USPC .......................................... 99/480, 481, 482
See application file for complete search history.

(56) References Cited

U.S. PATENT DOCUMENTS

| 1,333,552 | A | * | 3/1920 | Legg | ...................... A23B 4/052 |
| | | | | | 99/480 |
| 4,348,948 | A | * | 9/1982 | Allison | ...................... A21B 1/44 |
| | | | | | 126/18 |
| 4,700,618 | A | * | 10/1987 | Cox, Jr. | ...................... A21B 1/28 |
| | | | | | 126/25 R |
| 4,934,260 | A | | 6/1990 | Blevins | |
| 6,868,777 | B1 | | 3/2005 | Higgins et al. | |
| 10,098,500 | B1 | * | 10/2018 | Hutton | ...................... A23B 4/052 |
| 2009/0136638 | A1 | * | 5/2009 | Fujie | ...................... A23L 13/65 |
| | | | | | 426/314 |
| 2016/0360762 | A1 | | 12/2016 | Mann | |

FOREIGN PATENT DOCUMENTS

CH    313546 A  *  4/1956  ............. A23B 4/052
JP    2008307217 A    12/2008

* cited by examiner

*Primary Examiner* — Reginald Alexander
(74) *Attorney, Agent, or Firm* — Dority & Manning, P.A.

(57) ABSTRACT

An indoor smoker includes a cabinet including an exhaust duct, a smoking chamber, a firebox, and a bypass duct extending between the firebox and the exhaust duct. A damper is movable between a first position for closing the smoking chamber when a firebox temperature is outside a desired range and a second position for blocking the bypass duct when the firebox temperature is within the desired range. The damper thus regulates the flow of smoke such that only good smoke is directed into the smoking chamber, while bad smoke is routed directly to the exhaust duct.

14 Claims, 5 Drawing Sheets

SYSTEM AND METHOD FOR REGULATING THE FLOW OF SMOKE IN AN INDOOR SMOKER

FIELD OF THE INVENTION

The present subject matter relates generally to indoor smokers, and more particularly to systems and methods of smoke regulation in indoor smokers.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

In conventional smokers, the firebox is fluidly coupled to the smoking chamber such that all smoke generated within the firebox is directed into the smoking chamber. Notably, the quality of smoke produced is heavily dependent on the temperature at which the wood is burned. For example, the ideal temperature for producing the best smoke flavor is between about 650° F. and 750° F. Smoke produced outside these temperatures can add acrid flavors to the smoked food.

Accordingly, a smoker that has features for improved smoke regulation would be useful. More specifically, an indoor smoker that regulates the flow of smoke such that only desired smoke is provided into the smoking chamber would be particularly beneficial.

BRIEF DESCRIPTION OF THE INVENTION

Aspects and advantages of the invention will be set forth in part in the following description, may be apparent from the description, or may be learned through practice of the invention.

In one aspect of the present disclosure, an indoor smoker defining a vertical, a lateral, and a transverse direction is provided. The indoor smoker includes a cabinet including an exhaust duct and a smoking chamber positioned within the cabinet and defining a chamber inlet and a chamber outlet, the chamber outlet being in fluid communication with the exhaust duct. A firebox defines a primary outlet fluidly coupled to the chamber inlet, a bypass outlet, and a smoldering chamber for receiving combustible material. A bypass duct provides fluid communication between the bypass outlet and the exhaust duct and a firebox damper is movable between a first position where the primary outlet is blocked and a second position where the bypass outlet is blocked.

In another aspect of the present disclosure, a method of regulating a flow of smoke in an indoor smoker is provided. The indoor smoker includes a smoking chamber having a chamber outlet and a chamber inlet, a firebox defining a primary outlet fluidly coupled to the chamber inlet and a bypass outlet, and a firebox damper movable between a first position for blocking the primary outlet and a second position for blocking the bypass outlet. The method includes obtaining a firebox temperature, determining that the firebox temperature has reached a lower temperature threshold, and moving the firebox damper to the second position in response to determining that the firebox temperature has reached the lower temperature threshold.

In still another aspect of the present disclosure, an indoor smoker is provided defining a vertical, a lateral, and a transverse direction. The indoor smoker includes a cabinet including an exhaust duct and a smoking chamber positioned within the cabinet and defining a chamber inlet and a chamber outlet, the chamber outlet being in fluid communication with the exhaust duct. A firebox defines a primary outlet fluidly coupled to the chamber inlet, a bypass outlet, and a smoldering chamber for receiving combustible material. A bypass duct provides fluid communication between the bypass outlet and the exhaust duct and a damper is movable between a first position for closing smoking chamber and a second position for blocking the bypass duct.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. In addition, as used herein, terms of approximation, such as "approximately," "substantially," or "about," refer to being within a ten percent margin of error. Furthermore, the term "smoke" is generally used to refer to the flow of air, smoke, combustion byproducts, or any combination thereof through an appliance.

Figure 1:
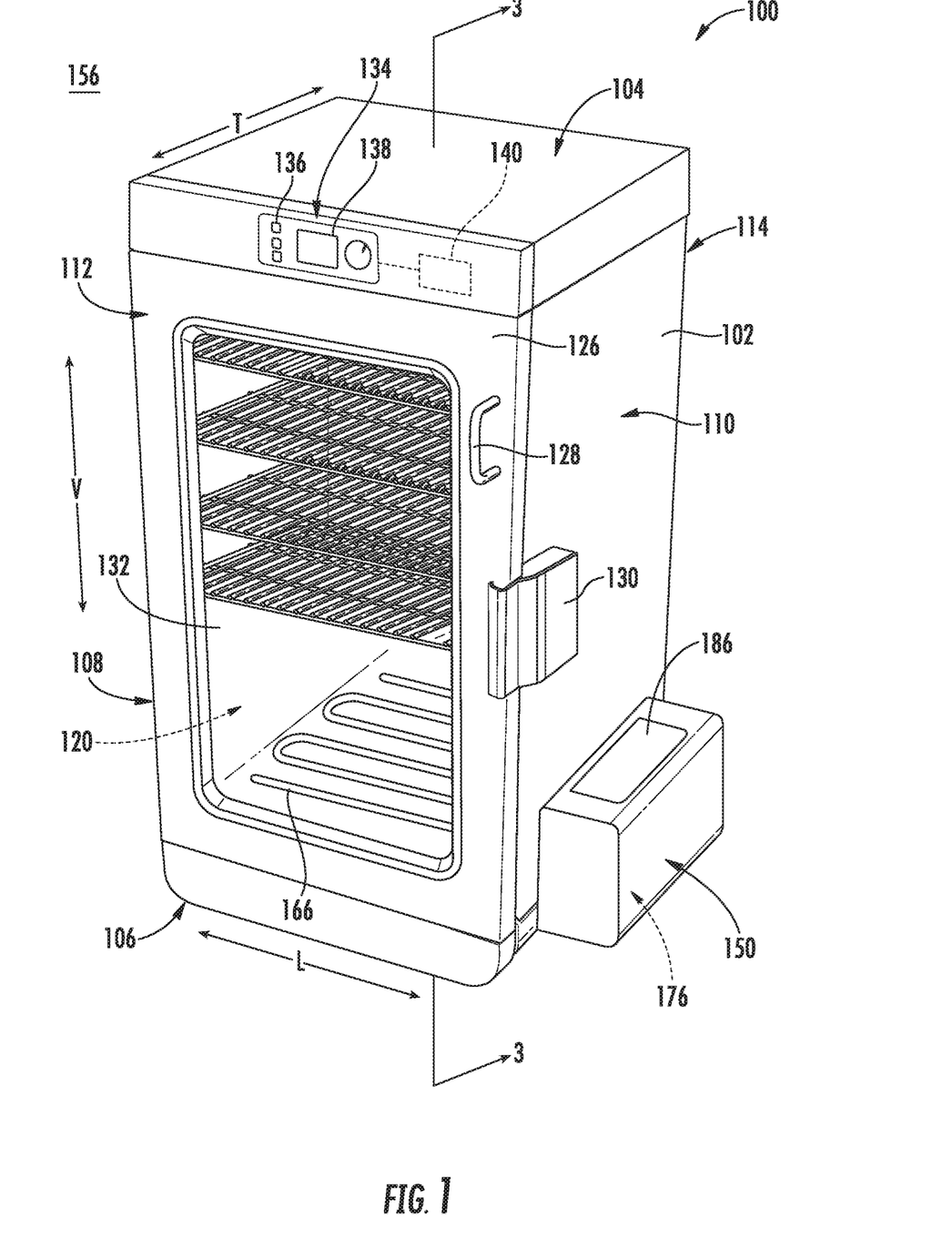
FIG. 1 provides a perspective view of an indoor smoker with all doors in a closed position in accordance with an example embodiment of the present disclosure.
Figure 2:
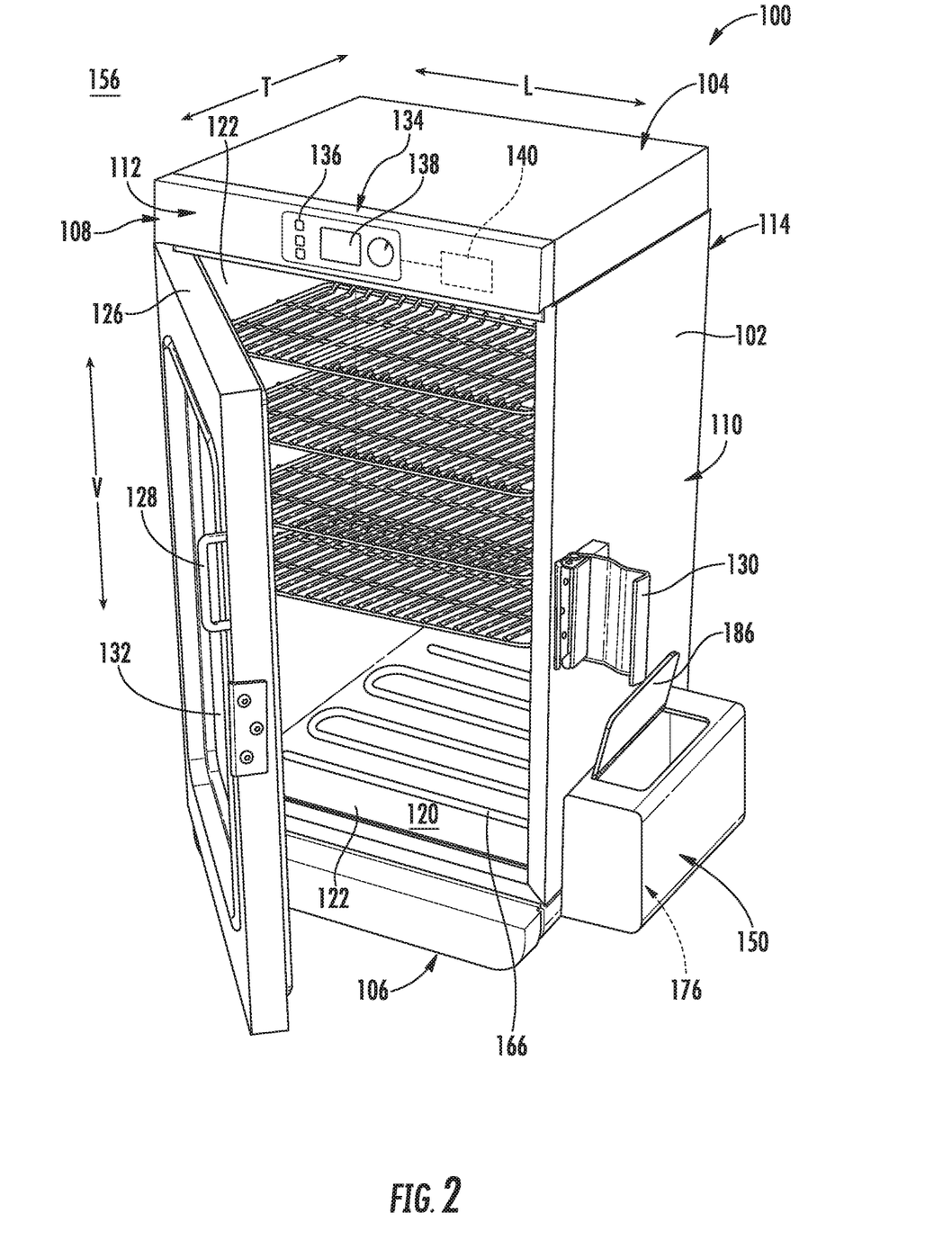
FIG. 2 provides a perspective view the exemplary indoor smoker of FIG. 1 with the doors opened.

FIGS. 1 and 2 provide perspective views of an indoor smoker 100 according to an exemplary embodiment of the present subject matter with doors in the closed position and the open position, respectively. Indoor smoker 100 generally defines a vertical direction V, a lateral direction L, and a transverse direction T, each of which is mutually perpendicular, such that an orthogonal coordinate system is generally defined. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulating gap defined between chamber walls 122 and cabinet 102. According to an exemplary embodiment, the insulation gap is filled with insulating material 124 (see FIGS. 3 and 4), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to regulate a flow of smoke or heated air in an appliance.

Figure 3:
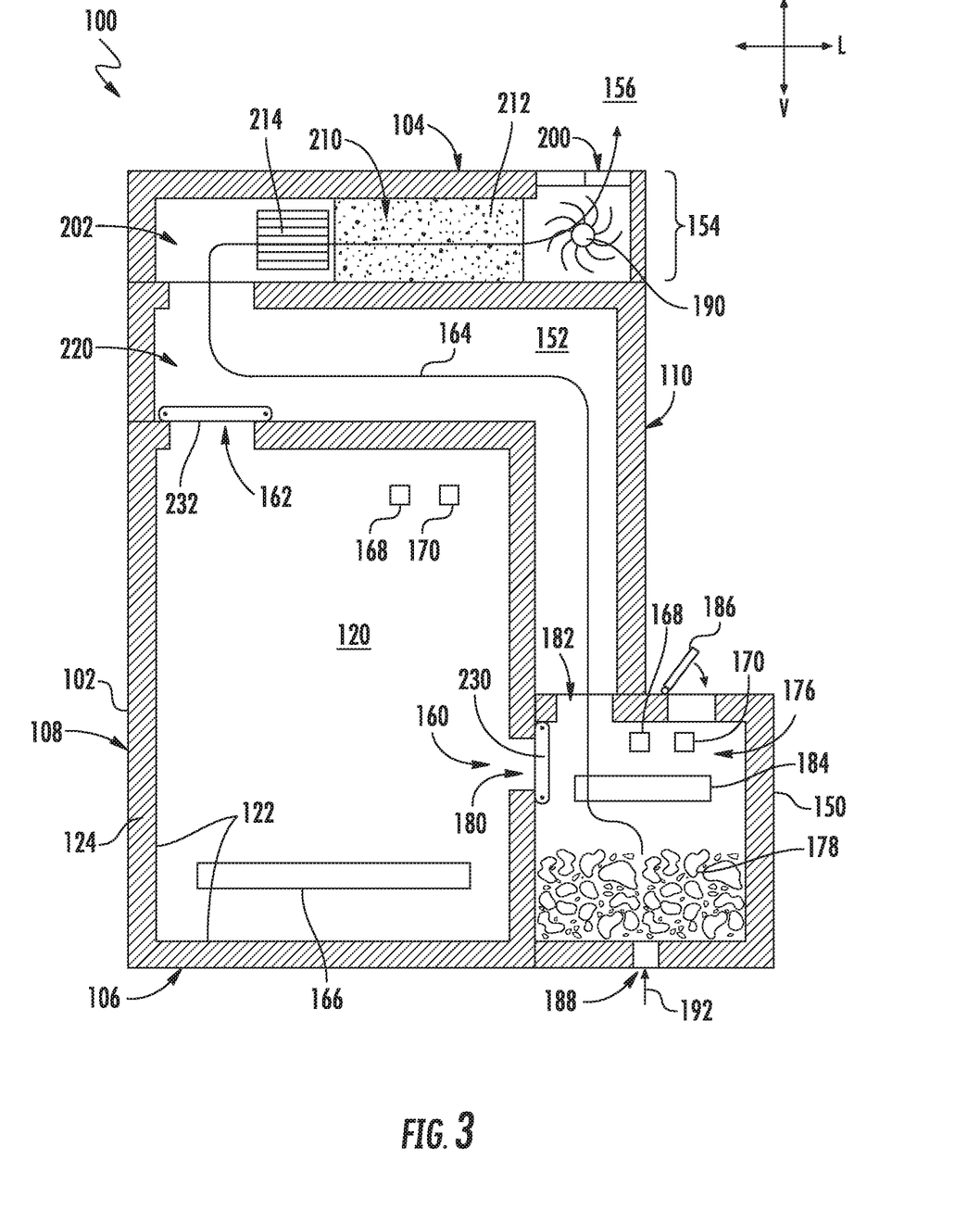
FIG. 3 provides a schematic, cross-sectional view of the exemplary indoor smoker of FIG. 1 taken along Line 3-3 of FIG. 1, with the smoker operating in a startup or overshoot mode.
Figure 4:
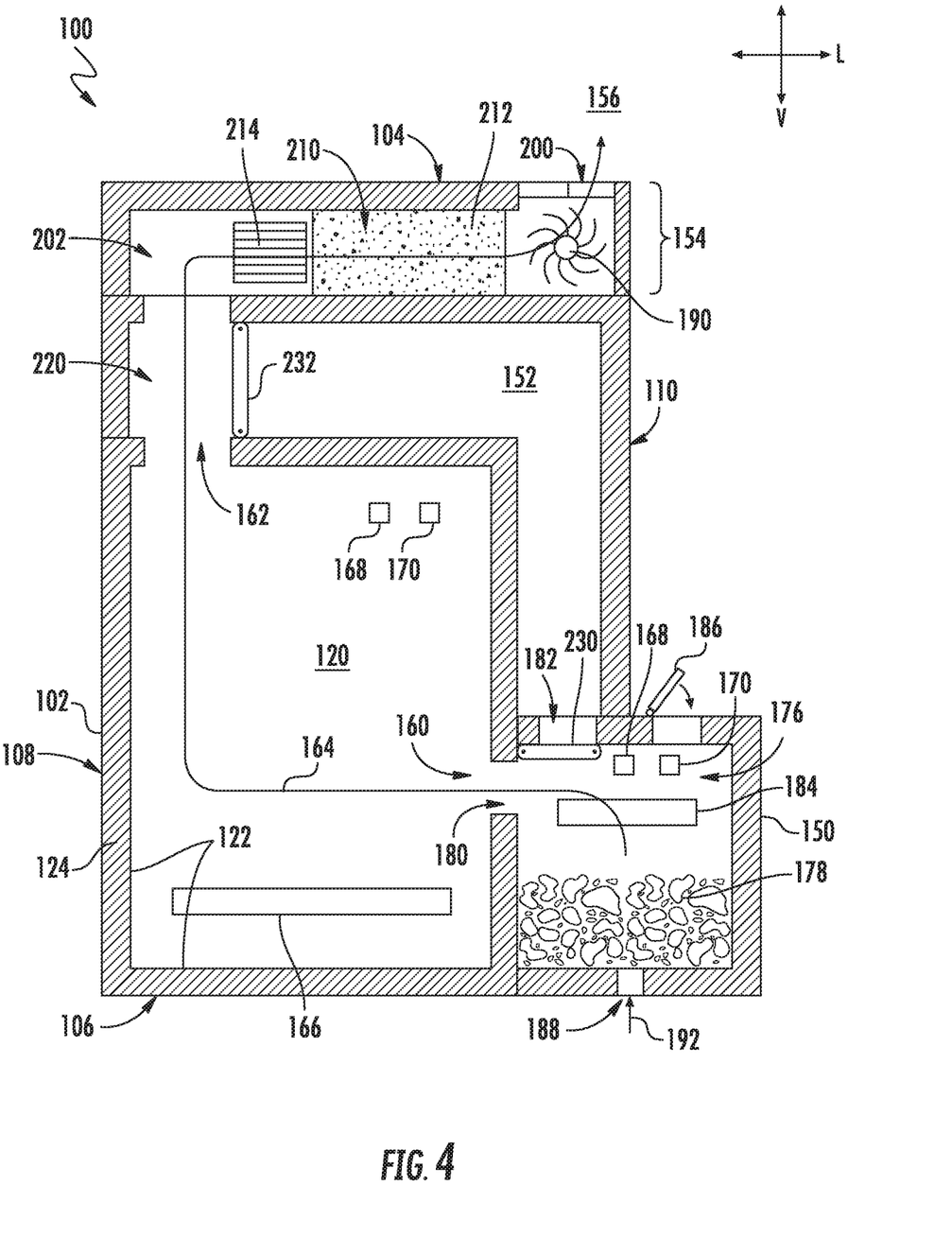
FIG. 4 provides a schematic, cross-sectional view of the exemplary indoor smoker of FIG. 1 taken along Line 3-3 of FIG. 1, with the smoker operating in an operating mode.

Referring now also to FIGS. 3 and 4, various internal components of indoor smoker 100 and their respective functions will be described according to an exemplary embodiment of the present subject matter. In this regard, FIGS. 3 and 4 illustrate schematic cross-sectional views of indoor smoker 100 taken along Line 3-3 of FIG. 1. As shown, indoor smoker 100 generally includes smoking chamber 120 for receiving items to be cooked/smoked, a firebox 150 for generating smoke, a bypass duct 152 for routing low quality smoke around smoking chamber, and an exhaust system 154 for safely discharging that smoke into an indoor environment 156 (i.e., outside of indoor smoker 100). Each of these will be described in detail below.

As illustrated, smoking chamber 120 defines a chamber inlet 160 and a chamber outlet 162. During a smoking operation, a flow of smoke (identified in FIGS. 3 and 4 by reference numeral 164) is drawn into smoking chamber 120 through chamber inlet 160 is discharged from smoking chamber 120 through chamber outlet 162 and exhaust system 154. According to an exemplary embodiment, chamber inlet 160 is defined proximate a bottom 106 of smoking chamber 120 at one side (e.g., second side 110 as shown) and the chamber outlet 162 is defined proximate top 104 of smoking chamber 120 at an opposite side (e.g., first side 108 as shown). In this manner, the flow of smoke 164 may have a tendency of being drawn over and up through the entire smoking chamber 120 for improved smoke coverage.

In order to ensure a desirable cooking temperature within smoking chamber 120, indoor smoker 100 further includes a chamber heater 166 that is positioned within or otherwise in thermal communication with smoking chamber 120 for regulating the temperature in smoking chamber 120. In general, chamber heater 166 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 166 is operated independently of firebox 150 (e.g., as described below), smoking chamber 120 may be maintained at any suitable temperature during a smoking process. More specifically, for example, chamber heater 166 may be turned off or on a very low setting for smoking cheeses or may be turned on high for quickly cooking and smoking meats.

In some embodiments, indoor smoker 100 also includes one or more sensors that may be used to facilitate improved operation of the appliance, such as described below. For example, indoor smoker 100 may include one or more temperature sensors and/or humidity sensors which are generally operable to measure the internal temperature and humidity in indoor smoker 100, e.g., within smoking chamber 120. More specifically, as illustrated, indoor smoker 100 includes a temperature sensor 168 and a humidity sensor 170 positioned within smoking chamber 120 and being operably coupled to controller 140. In some embodiments, controller 140 is configured to vary operation of chamber heater 166 based on one or more temperatures detected by temperature sensor 168 or humidity measurements from humidity sensor 170.

As described herein, "temperature sensor" may refer to any suitable type of temperature sensor. For example, the temperature sensors may be thermocouples, thermistors, or resistance temperature detectors. Similarly, "humidity sensor" may refer to any suitable type of humidity sensor, such as capacitive digital sensors, resistive sensors, and thermal conductivity humidity sensors. In addition, temperature sensor 168 and humidity sensor 170 may be mounted at any suitable location and in any suitable manner for obtaining a desired temperature or humidity measurement, either directly or indirectly. Although exemplary positioning of certain sensors is described below, it should be appreciated that indoor smoker 100 may include any other suitable number, type, and position of temperature and/or humidity sensors according to alternative embodiments.

Referring still to FIGS. 3 and 4, firebox 150 generally defines a smoldering chamber 176 which is configured for receiving combustible material 178. As used herein, "combustible material" is generally used to refer to any suitable material positioned within smoldering chamber 176 for generating smoke. Specifically, according to exemplary embodiments, combustible material 178 includes wood or wood byproducts, such as wood chunks, wood chips, wood pellets, or wood resin. Firebox 150 defines a primary outlet 180 that is fluidly coupled to chamber inlet 160 for providing the flow of smoke 164 into smoking chamber 120 during a smoking operation. In addition, firebox 150 defines a bypass outlet 182 through which the flow of smoke 164 may be expelled during certain conditions, as will be described in more detail below.

According to the illustrated embodiment, firebox 150 includes a smoldering heater 184 which is positioned in or otherwise in thermal communication with smoldering chamber 176 to smolder combustible material 178 stored in smoldering chamber 176. Similar to chamber heater 166, smoldering heater 184 may include one or more heating elements such as electric resistance heating elements, gas burners, microwave heating elements, halogen heating elements, or suitable combinations thereof. In addition, firebox 150 may include a dedicated temperature sensor 168 and humidity sensor 170 for detecting the temperature and humidity within smoldering chamber 176 for improved smoke generation and regulation.

As used herein, the verb "smolder" or variations thereof is intended to refer to burning a combustible material (e.g., combustible material 178) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 184 positioned within smoldering chamber 176. For typical combustible material used in smokers, e.g., wood and wood byproducts, a typical smoldering temperature is between about 650° F. and 750° F. However, the exact temperature may vary depending on the combustible material used, the air flow rate through smoldering chamber 176, the level of combustible material 178, and other factors.

According to the exemplary embodiment, firebox 150 may include a door 186 which is pivotally mounted on top of firebox 150 for providing selective access to smoldering chamber 176, e.g., to add additional combustible material 178. In addition, firebox 150 defines an air inlet 188 for receiving air to support the combustion or smoldering process. More specifically, as will be described in more detail below, indoor smoker 100 include an air handler 190 for urging a flow of air (indicated by reference numeral 192 in FIGS. 3 and 4) into smoldering chamber 176 through air inlet 188 for facilitating the smoldering process and smoke generation. Controller 140 is generally configured for regulating smoldering heater 184 and air handler 190 to achieve the desired smoldering of combustible material 184 and the desired amount of smoke within smoking chamber 120.

As mentioned briefly above, indoor smoker 100 further includes an exhaust system 154 which is generally configured for safely discharging the flow of smoke 164 from indoor smoker 100. Specifically, according to the illustrated embodiment, exhaust system 154 generally extends between chamber outlet 162 and a discharge vent 200 defined by cabinet 102 for directing the flow of smoke 164 from smoking chamber 120 to the environment 156. Although an exemplary exhaust system 154 is described below, it should be appreciated that variations and modifications may be made while remaining within the scope of the present subject matter. For example, the routing of ducts, the position of fans and dampers, and the types of sensors used may vary according to alternative embodiments.

As shown, exhaust system 154 includes an exhaust duct 202 that generally extends between and provides fluid communication between chamber outlet 162 and discharge vent 200. Air handler 190 is operably coupled with exhaust duct 202 for urging the flow of smoke 164 through exhaust duct 202 and out of discharge vent 200 to environment 156. According to the illustrated exemplary embodiment, air handler 190 is a tangential fan positioned within exhaust duct 202. However, it should be appreciated that according to alternative embodiments, air handler 190 may be positioned at any other suitable location and may be any other suitable fan type, such as an axial fan, a centrifugal fan, etc. In addition, according to an exemplary embodiment, air handler 190 is a variable speed fan such that it may rotate at different rotational speeds, thereby generating different air flow rates. In this manner, the amount of smoke drawn from smoldering chamber 176 may be continuously and precisely regulated.

Referring still to FIGS. 3 and 4, indoor smoker 100 further includes a catalytic converter 210 which is positioned within exhaust duct 202 for lowering or removing volatile organic compounds (VOCs) from the flow of smoke 164. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 210 generally includes a catalytic element 212 and a catalyst heater 214. In general, catalytic element 212 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 212 may combine oxygen ($O_2$) with carbon monoxide (CO) and unburned hydrocarbons to produce carbon dioxide ($CO_2$) and water ($H_2O$). In addition, according to exemplary embodiments, catalytic element 212 may remove nitric oxide (NO) and nitrogen dioxide ($NO_2$).

Notably, catalytic converters typically require that the catalyst be heated to a suitably high temperature in order to catalyze the necessary chemical reactions. Therefore, catalyst heater 214 is in thermal communication with catalytic element 212 for heating it to a suitable temperature, such as approximately 800° F. According to the illustrated embodiment, catalyst heater 214 is positioned upstream of catalytic element 212 to provide thermal energy through convection. However, it should be appreciated that according to alternative embodiments, catalyst heater 214 may be in direct contact with catalytic element 212 to provide thermal energy through conduction, or may be thermally coupled to catalytic element 212 in any other suitable manner.

Thus, during operation of indoor smoker 100 in an "operating mode," air handler 190 draws the flow of air 192 into smoldering chamber 176 through an air inlet 188. The flow of air 192 and combustible material 178 in the smoldering chamber 176 generate the flow of smoke 164 which is drawn into smoking chamber 120 through chamber inlet 160. The flow of smoke 164 passes through smoking chamber 120 for performing a smoking process on food items positioned therein before exiting smoking chamber 120 through chamber outlet 162. Air handler 190 and continues to urge the flow of smoke 164 through catalytic converter 210 and exhaust duct 202 before passing out discharge vent 200.

As explained herein, the quality of smoke produced is heavily dependent on the temperature at which combustible material 178 is burned. Smoke produced outside that desirable temperature range can add acrid flavors to the smoked food and is preferably not supplied into smoking chamber 120. More specifically, for example, the ideal temperature range within firebox 150 may be between 650° F. and 750° F. Therefore, for the exemplary embodiment described herein, indoor smoker 100 is said to be in the "operating mode" when a firebox temperature (e.g., as measured by temperature sensor 168 in smoldering chamber 176) is within this range. By contrast, indoor smoker 100 is said to be in a "startup/overshoot" mode of operation when the firebox temperature falls outside of this desired range. As explained below, indoor smoker 100 may include bypass duct 152 and damper systems which are generally configured for directing the flow of smoke 164 into smoking chamber 120 during the operating mode while bypassing the flow of smoke 164 around smoking chamber 120 in the startup/overshoot mode.

Referring now specifically to FIGS. 3 and 4, indoor smoker 100 includes bypass duct 152 that extends between and provides fluid communication between bypass outlet 182 and exhaust duct 202. More specifically, according to the illustrated embodiment, bypass duct 152 is positioned within cabinet 102 and extends around a perimeter of smoking chamber 120 from a top of firebox 150 to the exhaust duct 202. In this regard, the exhaust duct 202 may generally include a discharge plenum 220 which is directly fluidly coupled with the chamber outlet 162 and a discharge of bypass duct 152 and feeds the flow of smoke 164 into exhaust duct 202. Although smoking chamber 120 and bypass duct 152 are illustrated as being coupled to exhaust duct 202 through discharge plenum 220, it should be appreciated that they may be fluidly coupled at any other suitable location along exhaust duct 202.

In addition, indoor smoker 100 may include a system of dampers designed to regulate the flow of smoke 164 through cabinet 102. Specifically, according to the illustrated embodiment, indoor smoker 100 includes a firebox damper 230 that is rotatably mounted within smoldering chamber 176 and is movable between a first position where primary outlet 180 is substantially blocked and a second position where bypass outlet 182 is substantially blocked. Similarly, indoor smoker 100 includes an exhaust damper 232 that is rotatably mounted within the exhaust duct 202, or more specifically, within discharge plenum 220. Similar to firebox damper 230, exhaust damper 232 is movable between a first position where chamber outlet 162 is substantially blocked and the second position where bypass duct 152 is substantially blocked.

Notably, the damper positions described above are generally associated with the startup/overshoot and operating modes of indoor smoker 100. More specifically, the "first position" (e.g., as illustrated in FIG. 3) is generally associated with the startup/overshoot mode because firebox damper 230 blocks primary outlet 180 and exhaust damper 232 blocks chamber outlet 162 to prevent low quality smoke from entering smoking chamber 120. By contrast, the "second position" (e.g., as illustrated in FIG. 4) is generally associated with the operating mode because firebox damper 230 blocks bypass outlet 182 and exhaust damper 232 blocks bypass duct 152 to direct all generated smoke through smoking chamber 120. Thus, according to an exemplary embodiment, exhaust damper 232 is configured to move in unison with firebox damper 230, i.e., between the first and second positions.

According to still other embodiments, firebox damper 230 and exhaust damper 232 may be operated independently of each other and may be positioned at any suitable intermediate position between the first position and the second position. In addition, indoor smoker 100 may include only a single damper according to exemplary embodiments. For example, indoor smoker 100 may include only firebox damper 230 which is generally closes off primary outlet 180 during the startup/overshoot mode of operation, but blocks bypass duct 152 during the operating mode. Notably, in such a configuration, chamber outlet 162 remains open, potentially permitting the flow of smoke 164 from entering smoking chamber 120 through chamber outlet 162. However, in such an embodiment, air handler 190 may be configured for drawing a sufficient amount of air to prevent backflow into chamber outlet 162 and/or bypass duct 152 may be coupled to exhaust duct 202 at a location downstream from chamber outlet 162, thereby reducing the likelihood of smoke passing into the chamber outlet 162.

According to exemplary embodiments, controller 140 may be operably coupled with firebox damper 230, exhaust damper 232, and/or temperature and humidity sensors 168, 170 for regulating the operation of the damper system to achieve the desired flow of smoke. In this regard, as described in more detail below, firebox damper 230 and/or exhaust damper 232 may be moved from the first position to the second position when a firebox temperature reaches a predetermined lower temperature threshold, such as 650° F. If the firebox temperature reaches a predetermined upper temperature threshold, such as 750° F., firebox damper 230 and/or exhaust damper 232 may be moved from the second position back to the first position. In this manner, dampers 230, 232 of indoor smoker 100 may be positioned in the startup/overshoot mode when firebox temperatures are outside the desired range (e.g., as shown in FIG. 3) and may be positioned in the operating mode when firebox temperatures are within the desired range (e.g., as shown in FIG. 4). This method of operation will be described in more detail below.

Now that the construction and configuration of indoor smoker 100 has been described according to an exemplary embodiment of the present subject matter, an exemplary method 300 for regulating a flow of smoke within an indoor smoker will be described according to an exemplary embodiment of the present subject matter. Method 300 can be used to regulate smoke in indoor smoker 100, or any other smoker or cooking appliance. It should be appreciated that the exemplary method 300 is discussed herein only to describe exemplary aspects of the present subject matter, and is not intended to be limiting.

Figure 5:
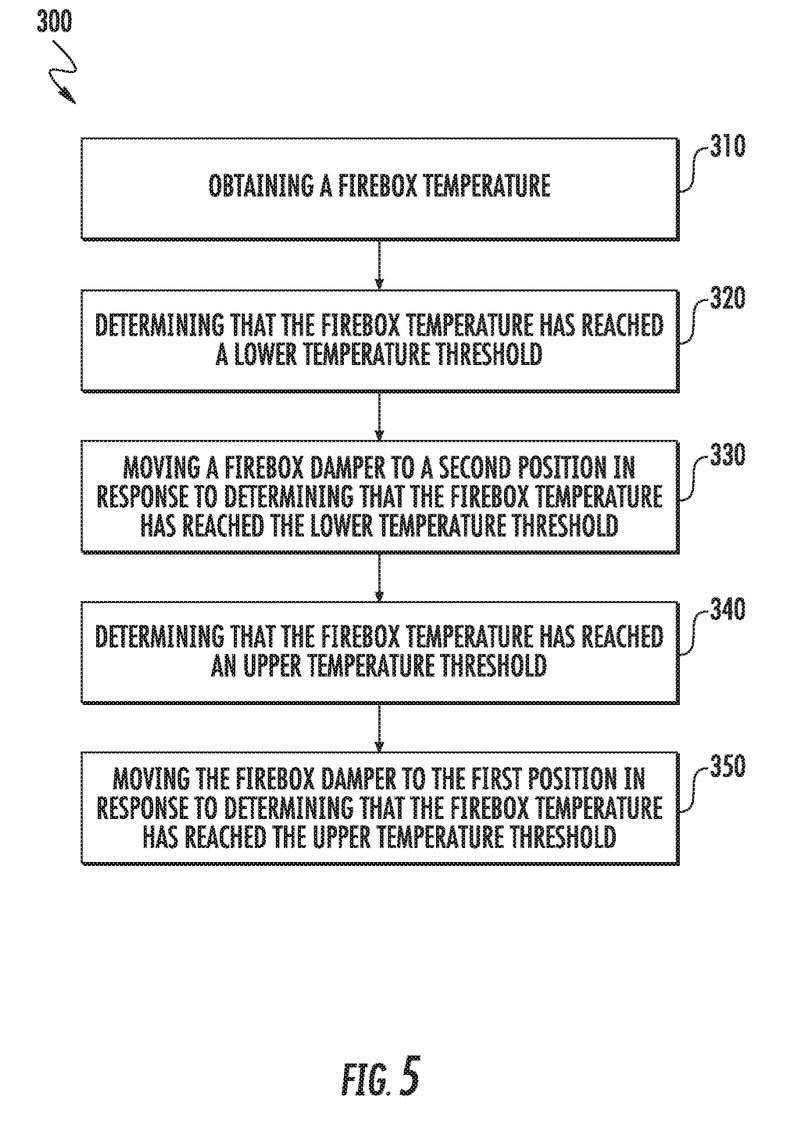
FIG. 5 is a method of regulating a flow of smoke in an indoor smoker according to an example embodiment of the present subject matter.

Referring now to FIG. 5, method 300 includes, at step 310, obtaining a firebox temperature. For example, continuing the example from above, controller 140 could obtain a firebox temperature using temperature sensor 168 positioned within smoldering chamber 176. As explained briefly above, the quality of smoke produced is heavily dependent on the temperature at which the wood is burned and smoke produced outside a desirable temperature range can add acrid flavors to the smoked food. Therefore, based on the firebox temperature, controller 140 may be used to adjust dampers within indoor smoker to direct the flow of smoke 164 around smoking chamber 120 when the smoldering chamber temperature is outside the desired range.

Method 300 includes, at step 320, determining that the firebox temperature has reached a predetermined lower temperature threshold, e.g., the lower temperature of the desired firebox range. According to exemplary embodiments, this lower temperature threshold may be the lowest temperature at which optimal smoke is produced, such as about 650° F. It should be appreciated that the lower temperature threshold may vary depending on a variety of factors, such as wood type, the moisture level of combustible material, user inputs, etc. Step 330 includes moving a damper, such as a firebox damper, to a second position (e.g., associated with an "operating mode") in response to determining that the firebox temperature has reached the lower temperature threshold.

When in the operating mode, the firebox damper closes off a bypass port or duct while opening a chamber inlet to the smoking chamber. In this manner, the flow of smoke generated in the smoldering chamber may pass into the smoking chamber to smoke food positioned therein. Thus, the acrid lower quality smoke may be discharged from indoor smoker to prevent imparting bad smells and flavors on the food, while the "good" smoke is used to smoke the food as desired.

Under certain circumstances, the temperature within the smoldering chamber may rise above the temperature range resulting in optimal smoke quality. Therefore, method 300 includes, at step 340 determining that the firebox temperature has reached an upper temperature threshold. Step 350 includes moving the firebox damper to a first position (e.g., associated with the "startup/overshoot" mode) in response to determining that the firebox temperature has reached the upper temperature threshold. According to an exemplary embodiment, the upper temperature threshold is about 750° F., and moving the damper to the first position may close off or seal the smoking chamber and open up the bypass duct. In this manner, the flow of smoke not directed into the smoking chamber, but is instead exhausted through the bypass duct and the exhaust conduit to prevent contact with food.

FIG. 5 depicts an exemplary method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using indoor smoker 100 as an example, it should be appreciated that these methods may be applied to regulate smoke in any other smoking appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker defining a vertical, a lateral, and a transverse direction, the indoor smoker comprising:
    a cabinet including an exhaust duct;
    a smoking chamber positioned within the cabinet and defining a chamber inlet and a chamber outlet, the chamber outlet being in fluid communication with the exhaust duct;
    a firebox defining a primary outlet fluidly coupled to the chamber inlet, a bypass outlet, and a smoldering chamber for receiving combustible material;
    a bypass duct providing fluid communication between the bypass outlet and the exhaust duct;
    a firebox damper being movable between a first position where the primary outlet is blocked and a second position where the bypass outlet is blocked; and an air handler operably coupled with the exhaust duct for urging a flow of smoke from the firebox; and a catalytic converter positioned within the exhaust duct for lowering volatile organic compounds within the flow of smoke.

2. The indoor smoker of claim 1, wherein the firebox damper is rotatably mounted within the smoldering chamber.

3. The indoor smoker of claim 1, comprising:

an exhaust damper mounted within the exhaust duct, the exhaust damper being movable between a first position where the chamber outlet is blocked and a second position where the bypass duct is blocked.

4. The indoor smoker of claim 3, wherein the exhaust damper is configured to move to the first position when the firebox damper moves to the first position and to the second position when the firebox damper moves to the second position.

5. The indoor smoker of claim 3, wherein at least one of the firebox damper and the exhaust damper are positionable at an intermediate position between the first position and the second position.

6. The indoor smoker of claim 1, wherein the firebox damper is moved from the first position to the second position when a firebox temperature reaches a predetermined lower temperature threshold.

7. The indoor smoker of claim 6, wherein the firebox damper is moved from the second position to the first position when the firebox temperature exceeds a predetermined upper temperature threshold.

8. The indoor smoker of claim 7, wherein the lower temperature threshold is approximately 650° F. and the upper temperature threshold is approximately 750° F.

9. The indoor smoker of claim 1, wherein the cabinet defines a discharge vent, the exhaust duct being in fluid communication with the discharge vent.

10. The indoor smoker of claim 1, comprising at least one of a temperature sensor and a humidity sensor positioned within the smoldering chamber.

11. An indoor smoker defining a vertical, a lateral, and a transverse direction, the indoor smoker comprising:

a cabinet including an exhaust duct;

a smoking chamber positioned within the cabinet and defining a chamber inlet and a chamber outlet, the chamber outlet being in fluid communication with the exhaust duct;

a firebox defining a primary outlet fluidly coupled to the chamber inlet, a bypass outlet, and a smoldering chamber for receiving combustible material;

a bypass duct providing fluid communication between the bypass outlet and the exhaust duct; and an exhaust damper rotatably mounted within the exhaust duct and being movable between a first position for closing smoking chamber and a second position for blocking the bypass duct.

12. The indoor smoker of claim 11, further comprising:

a firebox damper rotatably mounted within the smoldering chamber.

13. The indoor smoker of claim 11, wherein the exhaust damper is moved from the first position to the second position when a firebox temperature reaches a predetermined lower temperature threshold and is moved from the second position to the first position when the firebox temperature exceeds a predetermined upper temperature threshold.

14. The indoor smoker of claim 13, wherein the lower temperature threshold is approximately 650° F. and the upper temperature threshold is approximately 750° F.

* * * * *